(12) United States Patent
Osborne et al.

(10) Patent No.: US 11,733,194 B2
(45) Date of Patent: Aug. 22, 2023

(54) CERAMIC SMART IMPACT PANEL

(71) Applicant: CERAMIC TECHNOLOGY, INC., Cedar Bluff, VA (US)

(72) Inventors: Lee R. Osborne, Pounding Mill, VA (US); William Farley, Abingdon, VA (US); Stephane Guerchon, Cote St Luc (CA)

(73) Assignee: CERAMIC TECHNOLOGY, INC., Cedar Bluff, VA (US)

( * ) Notice: Subject to any disclaimer, the term of this patent is extended or adjusted under 35 U.S.C. 154(b) by 381 days.

(21) Appl. No.: 16/892,867

(22) Filed: Jun. 4, 2020

(65) Prior Publication Data
US 2021/0381995 A1 Dec. 9, 2021

(51) Int. Cl.
*G01N 27/20* (2006.01)
*G01N 27/04* (2006.01)
*E21F 17/18* (2006.01)
*B65G 11/16* (2006.01)

(52) U.S. Cl.
CPC ........... *G01N 27/20* (2013.01); *B65G 11/166* (2013.01); *E21F 17/18* (2013.01); *G01N 27/045* (2013.01); *B65G 2207/48* (2013.01)

(58) Field of Classification Search
CPC ...... B65G 11/16; B65G 11/163; B65G 11/166
See application file for complete search history.

(56) References Cited

U.S. PATENT DOCUMENTS

| | | | | |
|---|---|---|---|---|
| 3,624,344 | A * | 11/1971 | Kutzer | B65G 17/36 219/127 |
| 5,055,336 | A * | 10/1991 | Davis | B65G 11/166 428/167 |
| 6,129,967 | A | 10/2000 | Young et al. | |
| 7,172,144 | B1 * | 2/2007 | Slater | B02C 17/1805 241/300 |
| 10,543,985 | B2 | 1/2020 | Baric et al. | |
| 11,261,028 | B2 * | 3/2022 | Cheevers | B65G 11/16 |
| 2012/0043980 | A1 * | 2/2012 | Davies | G01B 7/18 324/693 |

(Continued)

FOREIGN PATENT DOCUMENTS

| | | | | |
|---|---|---|---|---|
| WO | WO-2012122587 A1 * | 9/2012 | ............. | G01N 3/56 |
| WO | WO-2019018883 A1 * | 1/2019 | ............. | B65G 11/16 |

OTHER PUBLICATIONS

"FLSmidth® FerroCer® Impact wear panels", FLSmidth, Video depicting impact panel with ceramic insert (FLSmidth), https://www.youtube.com/watch?v=I_VaE-C1NCQ, Feb. 23, 2017.

(Continued)

*Primary Examiner* — William R Harp
(74) *Attorney, Agent, or Firm* — Sughrue Mion, PLLC

(57) ABSTRACT

An impact panel for protecting mining equipment may include a plurality of ceramic tiles affixed to a base plate. The impact panel may further include at least one fixing hole disposed within the plurality of ceramic tiles and the base plate with a metal frame disposed around an outer peripheral edge of the plurality of ceramic tiles that is also affixed to the base plate. The impact panel may have at least one plug disposed inside the at least one fixing hole to seamlessly cover the at least one fixing hole. The panels may also be wired with sensors that will communicate with process control circuits allowing data collection on remote process and remote mining equipment.

12 Claims, 16 Drawing Sheets

(56) References Cited

U.S. PATENT DOCUMENTS

2019/0151855 A1* 5/2019 Davies .................... B02C 17/22

OTHER PUBLICATIONS

"FerroCer® 22 Impact Wear Panels", FLSmidth, Video depicting impact panel with ceramic insert (FLSmidth), https://youtu.be/bXk99vkTipc&feature=youtu.be, Mar. 21, 2019.
"FerroCer 22 Impact Wear Panels", Product Datasheet, FLSmidth, Feb. 2019, 2 pages.
"CTI-X7® Impact Test ID:012", Video depicting ceramic impact panel (Posted by Ceramic Technology Inc), https://virneo.com/225613208, 2017.

* cited by examiner

CERAMIC SMART IMPACT PANEL

FIELD

This disclosure relates generally to an impact panel used as a protective liner or panel in mining equipment where abrasive and/or corrosive material transported through the equipment causes damage and wear. In particular, this disclosure relates to an improved ceramic impact panel containing a plurality of ceramic tiles that provide impact protection and a ceramic plug inserted into a fixing hole that forms a seamless surface with the ceramic tiles and increases the life of the impact panel for use in mining equipment including chutes, hoppers, bins, and other materials handling equipment.

BACKGROUND

Reference to background art herein is not to be construed as an admission that such art constitutes prior art in the United States or elsewhere.

Traditionally liners for use in mining equipment are used in the minerals, mining, foundry, milling and materials handling industries in order to increase the life of equipment, decrease maintenance downtime, and therefore increase efficiency. Such liner panels are typically attached to the surfaces over which mined material is transported. Examples of such equipment include chutes, hoppers, cyclones, chambers, separators, and other equipment where abrasive and/or corrosive material cause wear and damage to the equipment in order to provide an area of protection from the impact of crushed rock, coal, ore, and other aggregates.

However, steel traditional impact panels are prone to premature failure due to mined material repeatedly impacting the fastening mechanism used to secure the impact panels to the equipment causing plate to wear out before the protection layer was completely worn.

SUMMARY

According to an aspect of the disclosure, a ceramic impact panel may include a plurality of ceramic tiles affixed to a base plate; at least one fixing hole disposed within the plurality of ceramic tiles and the base plate; a metal frame disposed around an outer peripheral edge of the plurality of ceramic tiles and affixed to the base plate; and at least one plug configured to be inserted into the at least one fixing hole, wherein the at least one plug is inserted into the at least one fixing hole to seamlessly cover the at least one fixing hole.

According to a second aspect of the disclosure, an impact panel may include a plurality of tiles affixed to a base plate; and a sensor disposed in a surface of the impact panel configured to measure a wear condition of the impact panel.

According to a third aspect of the disclosure, a method for installing a ceramic impact panel sensor and monitoring a wear condition of the ceramic impact panel may include sealing a sensor and wiring inside a coupling using a pipe plug to protect the sensor and the wiring during transport; removing the pipe plug; attaching the wiring to a wireless transmitter; screwing the wireless transmitter into the coupling; and remotely monitoring a wear condition of the impact panel by a remote monitoring device.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating one skilled in the art in understanding this disclosure in conjunction with the detailed description. In the drawings.

DETAILED DESCRIPTION

Detailed embodiments of the claimed structures are disclosed herein; however, it can be understood that the disclosed embodiments are merely illustrative of the claimed structures that may be embodied in various forms. Aspects of this disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

Figure 1:
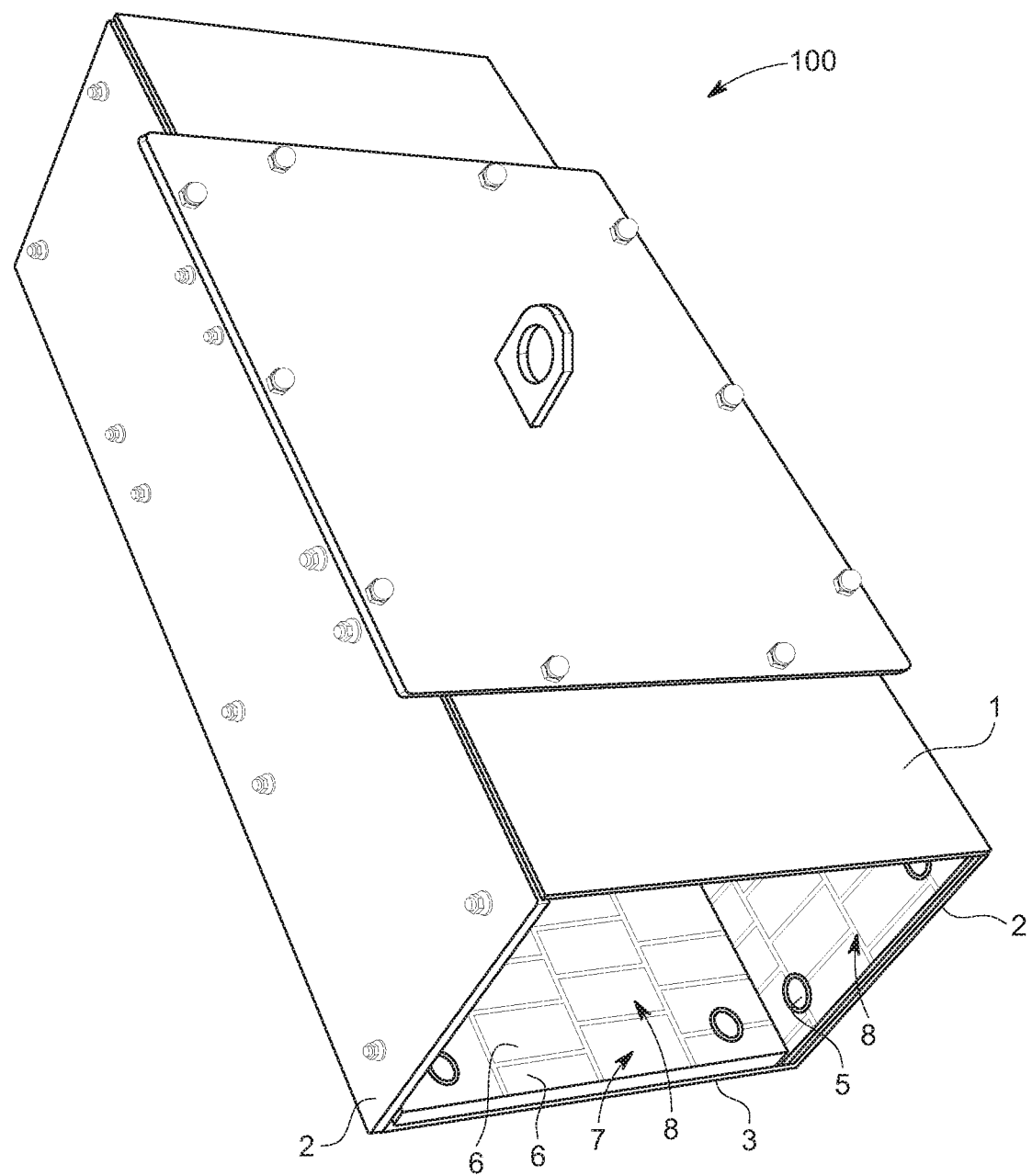
FIG. 1 is an exemplary embodiment of a perspective view of the ceramic impact panel disposed inside a mining chute.

FIG. 1 depicts an exemplary embodiment of a perspective view of the ceramic impact panel disposed inside a mining chute. The mining chute 100 of the present embodiment includes a top panel 1, two side panels 2, and a bottom panel 3. Additionally, ceramic impact panels 8 are attached to the top panel 1, two side panels 2, and the bottom panel 3 and are preferably made up of a plurality of individual ceramic tiles 6. The side panels 2 and bottom panel 3 serve as an attachment surface 16 for the ceramic impact panels 8. Each impact panel 8 is attached to the attachment surfaces 16 at fixing holes 12 disposed in the ceramic impact panels 8. Each fixing hole is covered by a ceramic plug 5. The ceramic tiles 6 and plug 5 are preferably Alumina ($Al_2O_3$) ceramic but are not limited thereto and may be made of other materials such as steel, silicone carbine, chromium carbide, and ultra-high molecular weight or hard plastic.

Figure 2:
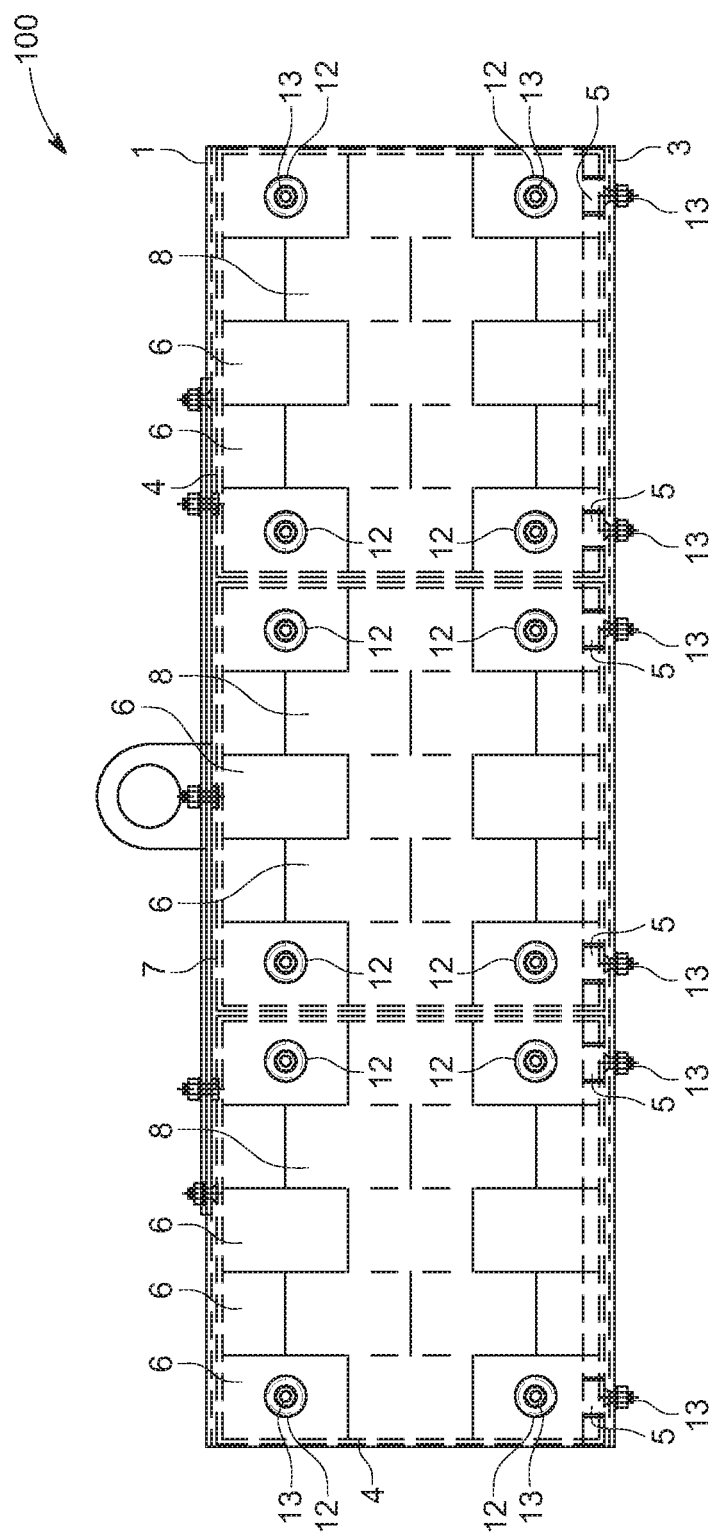
FIG. 2 is an exemplary embodiment of a side view of the ceramic impact panel disposed inside the mining chute of FIG. 1.

FIG. 2 depicts a side view of an exemplary embodiment of a ceramic impact panel 8 disposed inside a mining chute 100. The side view shows a single section of a mining chute that is three ceramic impact panels 8 in length. The chute has three panels on each side and the bottom of the chute 100. Each of the ceramic impact panels 8 is made up of a plurality of ceramic tiles 6 that are affixed to a base plate 11. The metal base plate 11 may have a thickness of ⅜ to ⅝ inches. However, panels requiring more rigidity may have a base plate with a thickness greater than ⅝ inches. The ceramic tiles 6 are preferably attached to the base plate 11 using an epoxy resin; however, other means including glue, adhesive, welds, fasteners, and the like may be used. The ceramic tiles 6 are arranged next to each other on the base plate 11 so as to form a uniform and unbroken surface 7. That is, there are no gaps between the individual ceramic tiles. However, in larger impact panels, every three or four rows of tiles may be separated by a metal reinforcement bar that provides additional structural stability to the impact panel 8.

FIG. 2 further depicts a fastening mechanism 13 that is used to attach each impact panel 8 to the attachment surface 16. Each impact panel 8 contains at least one fastening mechanism 13 used to attach the impact panel 8 to the desired attachment surface 16. However, each panel 8 is preferably attached to the attachment surface 16 at four positions located at the four corners of the impact panel 8. Each of the of the four positions is located in the middle of the ceramic tile 6 so as to not overlap an edge of the ceramic tile 6.

Figure 3:
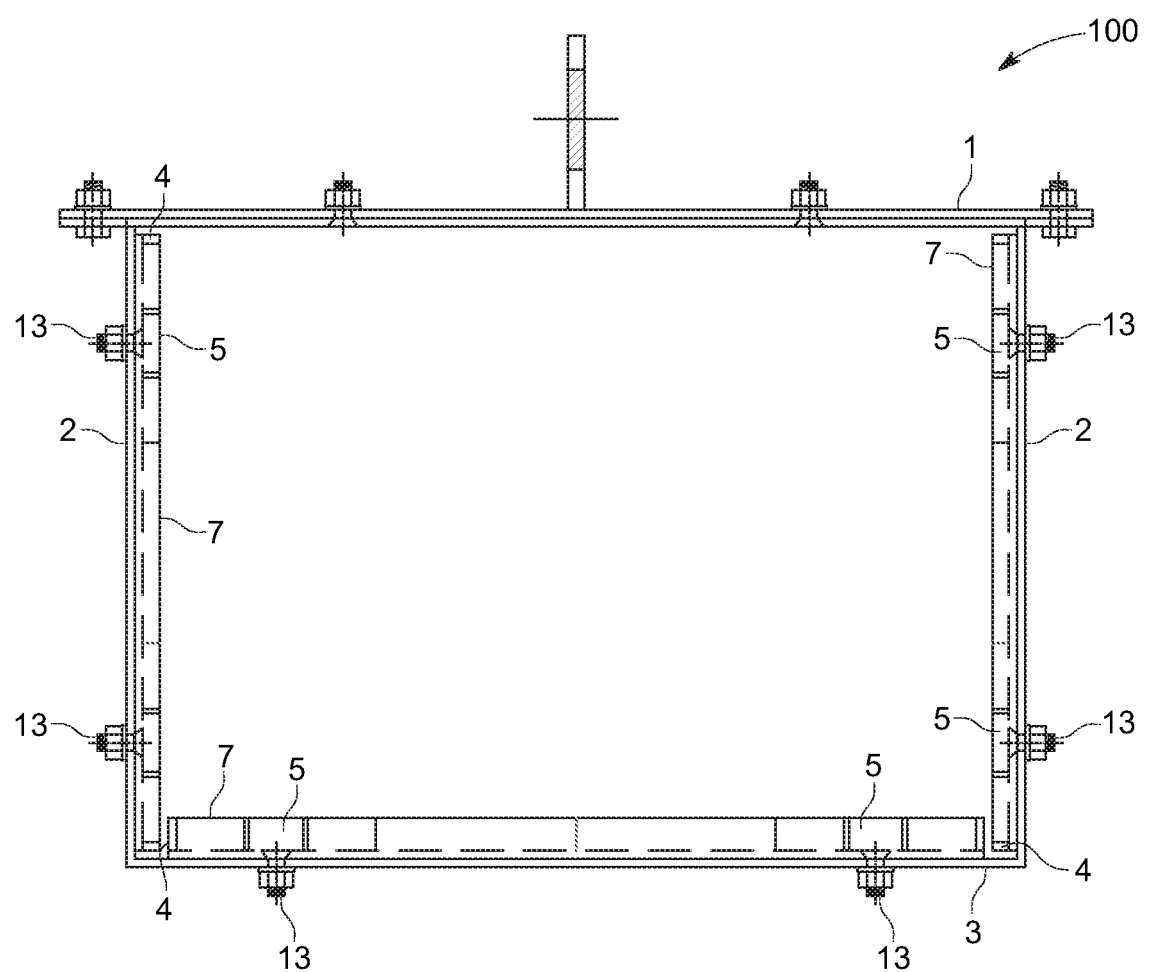
FIG. 3 is a cross-sectional view of the FIG. 2 mining chute.

FIG. 3 depicts a cross section of the mining chute 100. FIG. 3 shows panels of different tile thicknesses combined in a single chute 100. The exemplary mining chute shown in FIG. 3 depicts ceramic impact panels 8 on the two side panels 2 and bottom panel 3 of the chute 100. However, the configuration of ceramic impact panels 8 in the mining chute is not limited thereto.

Figure 4:
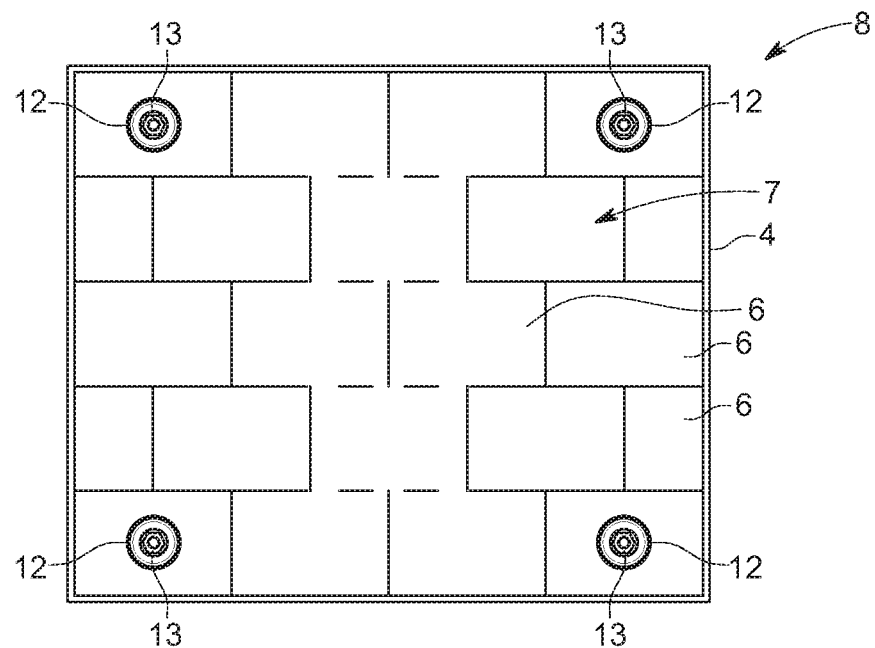
FIG. 4 is a schematic view of an exemplary ceramic impact panel.

FIG. 4 is a schematic view of an exemplary ceramic impact panel 8. The impact panel 8 may have a thickness in the normal direction to the surface 7 of 0.25 inches to 6 inches depending on the application in which it is to be used. Mining equipment, such as the mining chute 100, that is used in the transport of heavy materials such as large rocks require thicker ceramic panels than smaller and softer materials. The thicker panels increase the strength and overall life of the panel. Each impact panel 8 is mounted to an attachment surface 16 which may include but is not limited to mining shafts, chutes, large outside diameter piping, prescreens, screens, cyclones, hoppers, and sump systems.

Further, FIG. 4 depicts ceramic tiles 6 with a surface area of 4 inches by 6 inches. However, depending on the application, the surface area of the ceramic tiles can be smaller or larger than 4 inches by 6 inches.

The ceramic impact panel 8 includes a metal frame 4 disposed around the perimeter of the surface 7 formed by the plurality of ceramic tiles 6. The metal frame 4 is attached to the base plate using epoxy resin or a similar adhesive. Alternatively, the metal frame 4 may be welded to the base plate 11.

The overall size of the tile generally ranges from 1×1 feet to 3×3 feet. The panels are sized based on the application in which they are to be used based on the shape of the attachment surface 16. However, in order to facilitate quick and easy maintenance and replacement of the panels, it is beneficial to limit the overall weight of the impact panel 8 to under 75 pounds to permit a single worker to install and remove the panels. While FIG. 4 depicts a rectangular shaped pane, the impact panel 8 may be formed in any shape based on the shape of the space that needs to be protected by the impact panel 8.

The ceramic impact panel 8 of FIG. 4 contains four fixing holes 12. Each fixing hole 12, is used to attach the ceramic impact panel 8 to the attachment surface 16. The fixing hole 12 extends from the surface 7 of the ceramic tiles 6 in a normal direction to the surface 7 of the tile and continues to the base plate 11. A through hole 14 is disposed in the base plate 11 coinciding with the fixing hole 12. This fixing hole 12 and through hole 14 enable the ceramic impact panels 8 to be attached to the attachment surface 16 by plug welding or using a fastening means. The fixing hole 12 is disposed inside a hole in the ceramic tile 6 and may be lined with metal to provide increased impact protection. Alternatively, the metal liner may be eliminated so that the fixing hole 12 is solely formed by the hole disposed in the ceramic tile 6.

Figure 5:
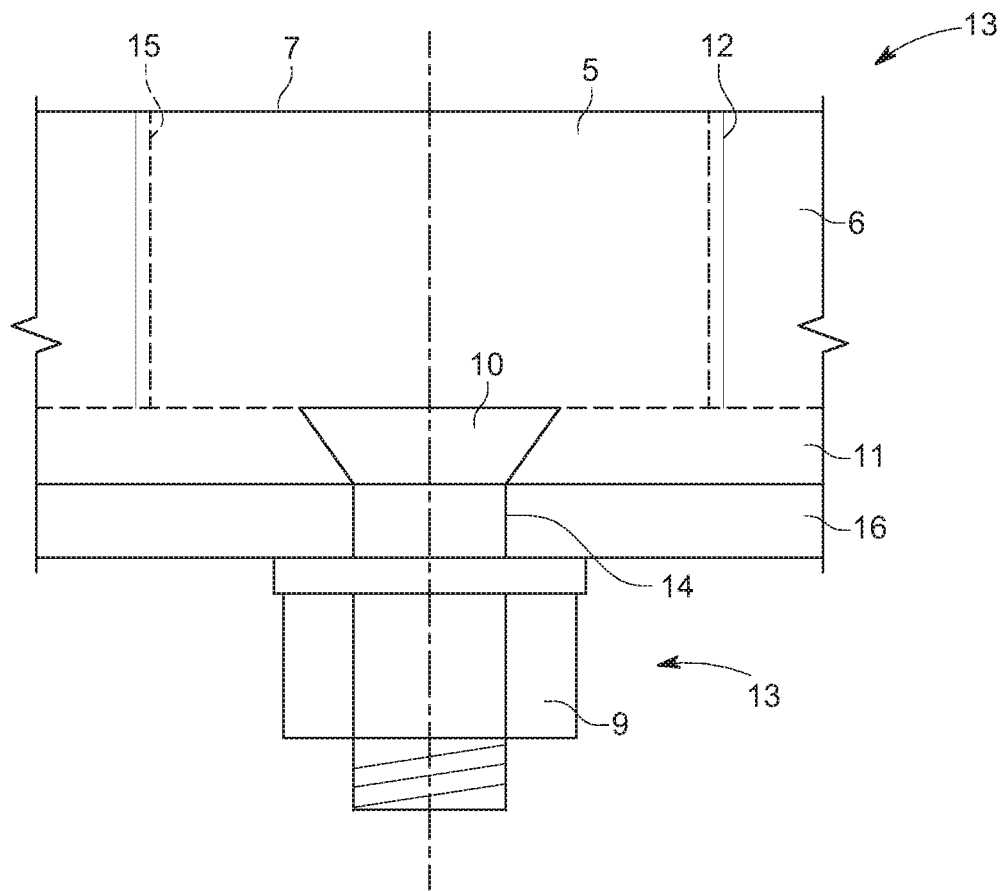
FIG. 5 is an exemplary embodiment of a cross-sectional view of the ceramic impact tile mining chute fastening mechanism.

FIG. 5 depicts a cross-sectional view of the ceramic impact panel 8 fastening mechanism 13. The fastening mechanism 13 depicted in FIG. 5 is an exemplary embodiment of a fastening mechanism used to attach the ceramic impact panel to an attachment surface 16 and the fastening mechanism is not limited to the mechanism depicted in FIG. 5. The fastening mechanism 13 includes a fastener 10 that is inserted into the fixing hole 12 in the ceramic impact panel 8. The fastener 10 may be a threaded screw, bolt, toggle bolt, or the like. Additionally, the head of the bolt or screw may be of flat, oval, pan, truss, round, hex, hex washer, slotted hex washer, socket cap, button type, or the like. FIG. 5 depicts a nut 9 that is attached to the threaded end of the fastener 10 to secure the ceramic impact panel 8 to the attachment surface 16. The nut 9 is disposed on the side of the attachment surface 16 opposite the ceramic impact panel 8. The nut 9 may be a hex, locking, jam, wing, cap, acorn, flange, castle, slotted, or square type nut or the like. However, a nut 9 is not required to fasten the ceramic impact panel 8 to the attachment surface 16 if a another fastening mechanism is used such as a spot weld. Likewise, a nut 9 is not required if the fastener 10 screws directly into the attachment surface 16. The fastener 10 must be longer than the thickness of the of the base plate to permit the fastener 10 to attach the impact panel 8 to the attachment surface 16.

FIG. 5 further depicts a ceramic plug 5 disposed overtop of the fastener 10 inside the fixing hole 12. The ceramic plug 5 disposed inside the fixing hole 12 forms seamless surface 7 with the plurality of ceramic impact tiles 6. This seamless surface 7 reduces the wear of the panels caused by transported material impacting the ceramic impact panel 8 and also increases the strength of the panel. 8. Specifically, the seamless surface reduces wear because there are no edges or protrusions for the mined material to repeatedly strike when passing over the panel 8.

The ceramic plug 5 ranges in thickness to match the thickness of the ceramic impact tile 6 so that the surface 7 is uniform over the entire surface 7 of the impact panel 8. Further, a plurality of plugs 5 may be stacked to achieve the desired thickness based on the thickness of the ceramic tiles 6. Each plug 5 and each fixing hole 12 as shown in the drawings is 1.5 inches in diameter. However, larger and smaller sized plugs and fixing holes may be used depending on the application. For example, if a smaller sized panel is desired, the diameter of the fixing hole and plug may be reduced. Conversely, if a larger panel is desired, the diameter of the fixing hole and plug may be increased.

Each plug 5 is secured inside the fixing hole using epoxy resin. Resin is applied to the outer perimeter 15 of the plug 5 when the plug 5 is inserted into the fixing hole 12 to secure the plug 5 inside the fixing hole 12.

Figure 6:
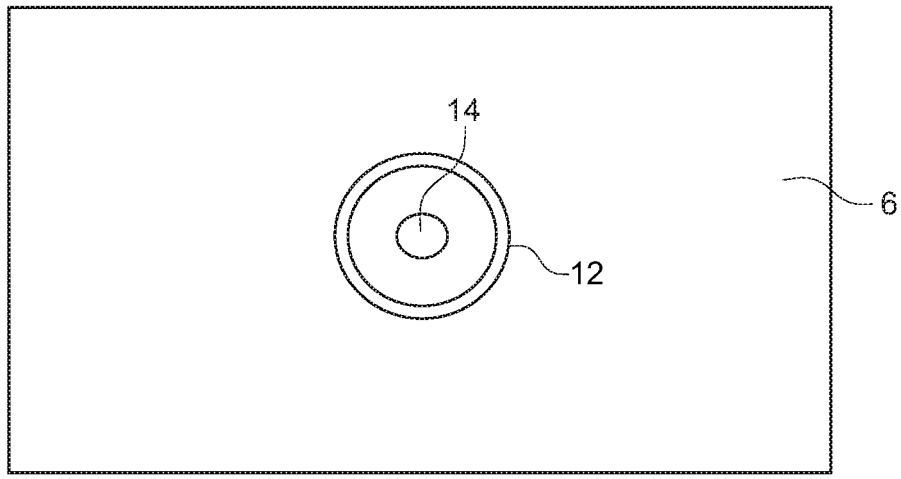
FIG. 6 is an exemplary embodiment of a fixing hole of a ceramic impact panel.

FIG. 6 depicts a single fixing hole 12 inside a ceramic impact tile 8. The fixing hole 12 extends from the surface 7 to the base plate 11. A through hole 12 which is smaller in diameter than the fixing hole 12 is disposed in the base plate 11 coinciding with the fixing hole 12. The diameter of the fixing hole 12 must be greater than the diameter of the head of the fastener 10 so that the fastener 10 can be inserted into the fixing hole 12. Further, the diameter of the through hole 14 must be smaller than the diameter of the head of the fastener 10 so that the head of the fastener cannot pass through the through hole 14. The through hole 14 may be a normal hole or alternatively may be counter-bored or counter-sunk to allow the top of the head of the fastener 10 to be flush with the base plate 11.

Figure 7:
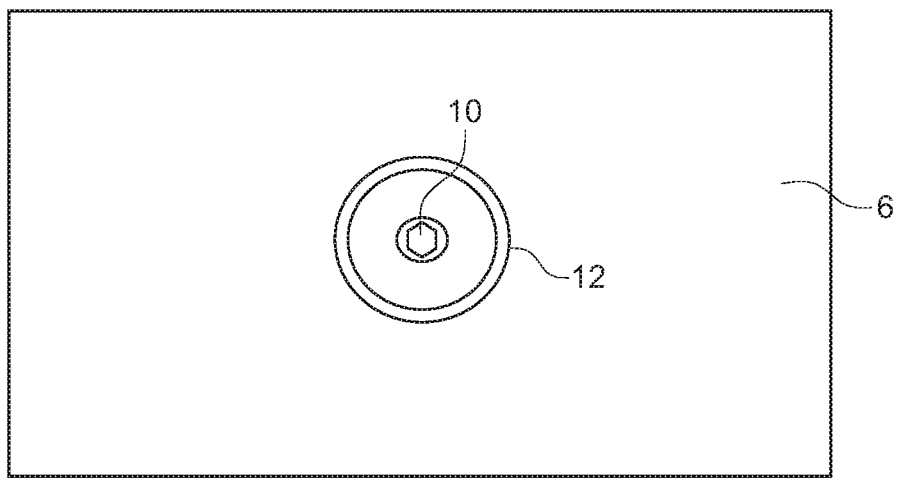
FIG. 7 is an exemplary embodiment of a fixing hole of a ceramic impact panel with a fastener inserted in the fixing hole.
Figure 8:
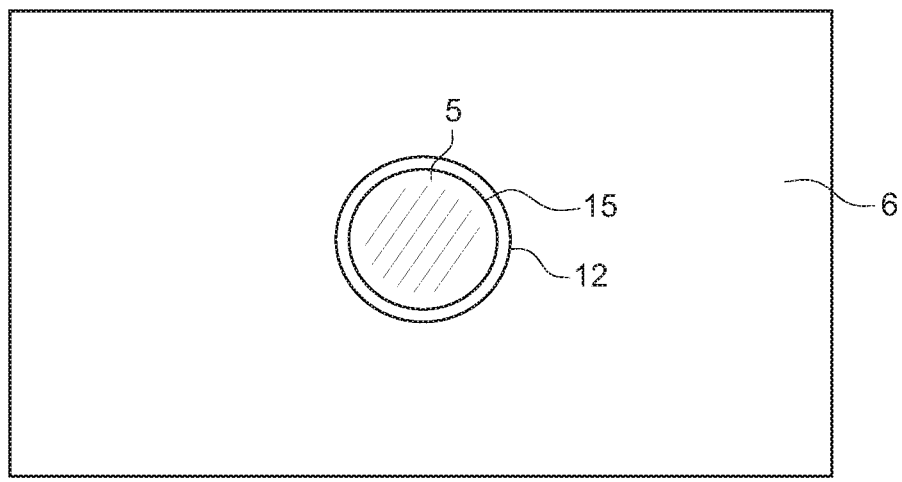
FIG. 8 is an exemplary embodiment of a fixing hole of a ceramic impact panel with a plug inserted in the fixing hole.

FIG. 7 shows the fixing hole 12 of FIG. 6 with a fastener 10 disposed inside the fixing hole 12 and through hole 14. FIG. 8 depicts the structures depicted in FIGS. 7 and 8 with a plug 5 disposed inside the fixing hole 12. The plug 5 forms a seamless surface with the ceramic tile 6. This planar surface 7 of the impact panel 8 provides increased wear resistance because material that impacts the panel is contacting the stronger ceramic material instead of the fastening mechanism that is prone to failure after extended deployment.

Figure 9:
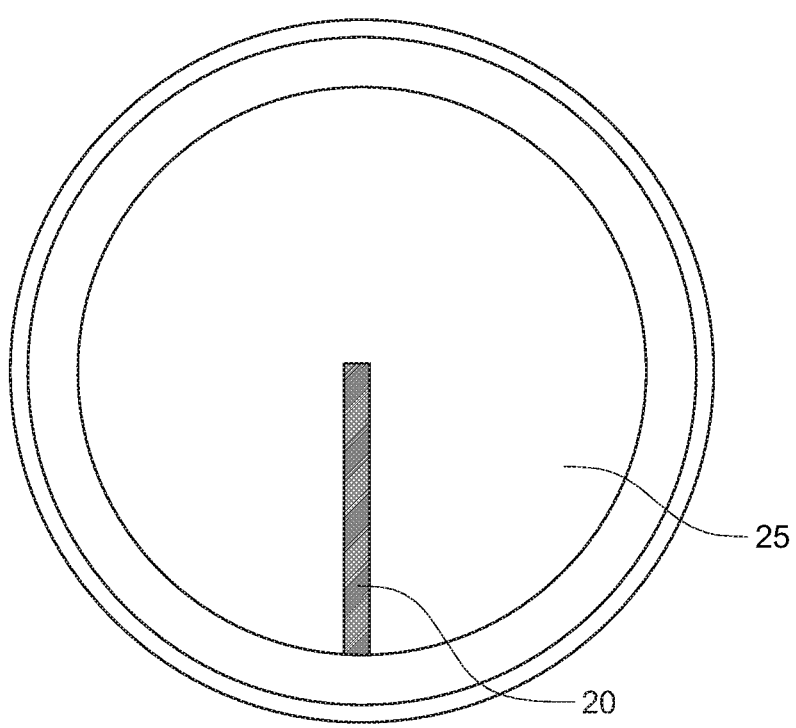
FIG. 9 depicts a second embodiment of a ceramic impact panel plug.

FIGS. 9-14 depict a second embodiment of the ceramic impact panel. A plurality of sensors 20 may be disposed in between the ceramic tiles 6 and inside a plug 25. FIG. 9 is an exemplary embodiment of a plug 25 with an embedded sensor 20 for detecting a wear condition of the impact panel 8. The sensor 20 is a thin Printed Circuit Board (PCB) containing 3 conductive loops 27. The sensor 20 is preferably one inch wide and extends in a radial direction from the center of the plug 25.

20 also extends the entire height of the plug 25. The sensor may have a height between 0.5 inches and 2 inches depending on the thickness of the ceramic tiles 6. Sensors 20 with a height larger than 2 inches may be used when the thickness of the ceramic tiles 6 is greater than 2 inches. Additionally, sensors 20 with a width greater or less than one inch may be used when using plugs 25 of different sizes.

Figure 10:
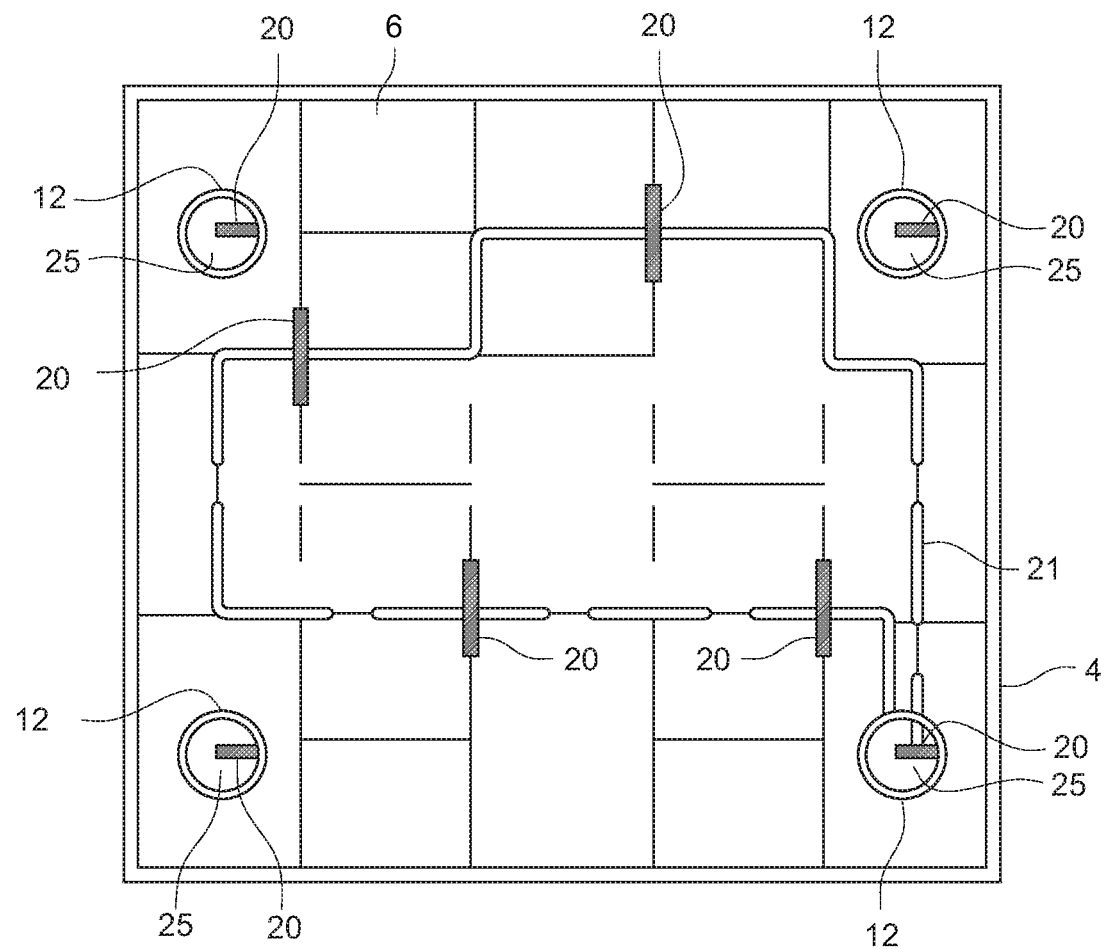
FIG. 10 is a schematic view of an exemplary ceramic impact panel according to a second embodiment.
Figure 11:
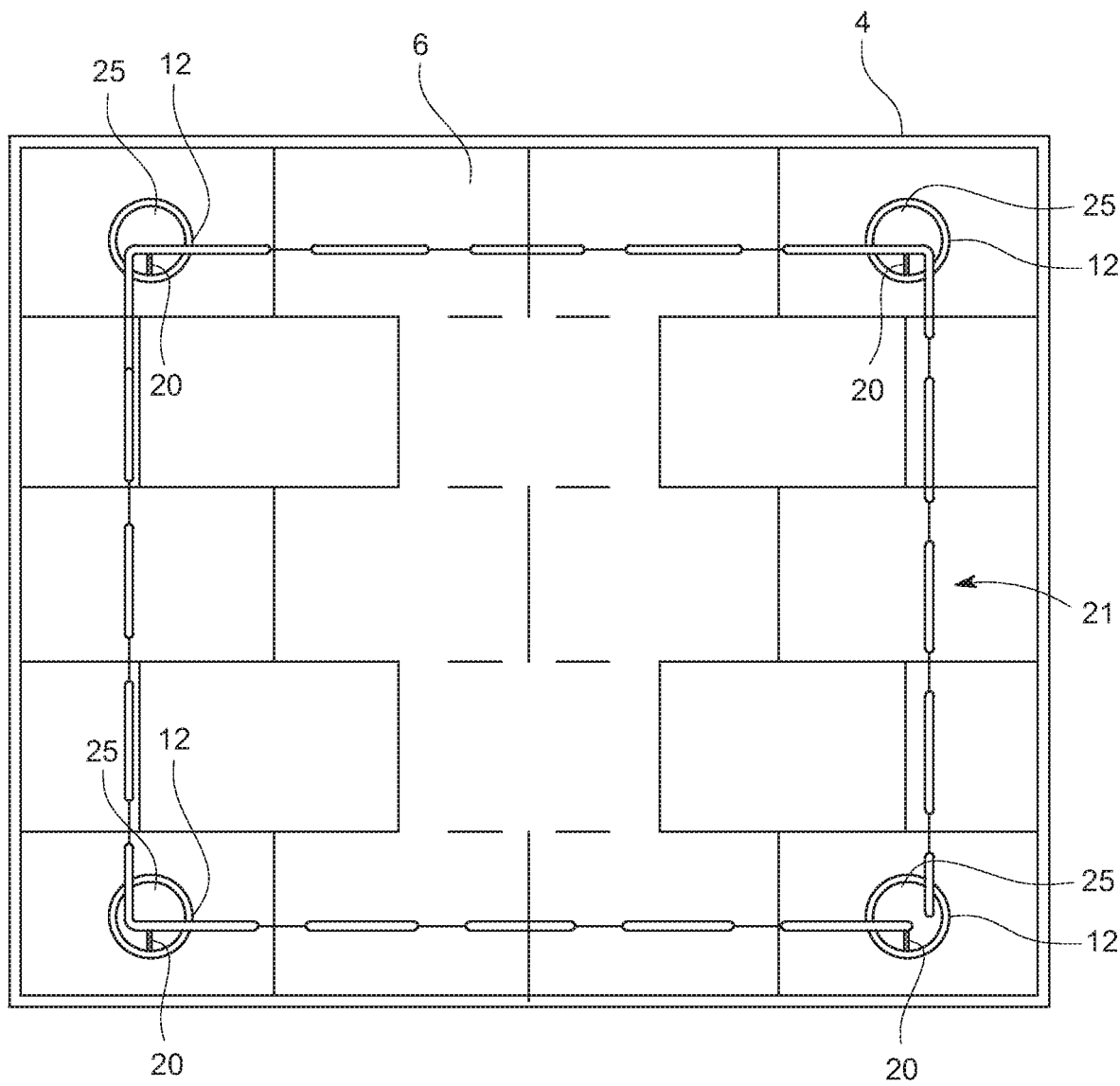
FIG. 11 is a schematic view of an exemplary ceramic impact panel according to a third embodiment.

FIGS. 10 and 11 depict an exemplary embodiment of a ceramic impact panel with sensors 20 embedded in the surface 7 of the impact panel. The sensors 20 create a seamless surface with the plurality of ceramic tiles 6 and plugs 25. Each plug 25 may have an embedded sensor 20. Additionally, sensors 20 may be embedded in the surface 7 between the ceramic tiles 6. The ceramic tiles 6 and plug 25 are preferably Alumina ($Al_2O_3$) ceramic but are not limited thereto and may be made of other materials such as steel, silicone carbine, chromium carbide, and ultra-high molecular weight or hard plastic. The sensors 20 are connected using a 3-wire cable 21 that is connected to each sensor 20. Specifically, each of the wires in the 3-wire cable 21 connects to a corresponding PCB loop 27 in the sensor 20. The cable 21 is disposed on a bottom surface of the impact panel 8 so that abrasive and/or corrosive material transported through the equipment does not destroy the cable 21 and prevent the sensor 20 from indicating the wear condition of the panel.

Figure 12:
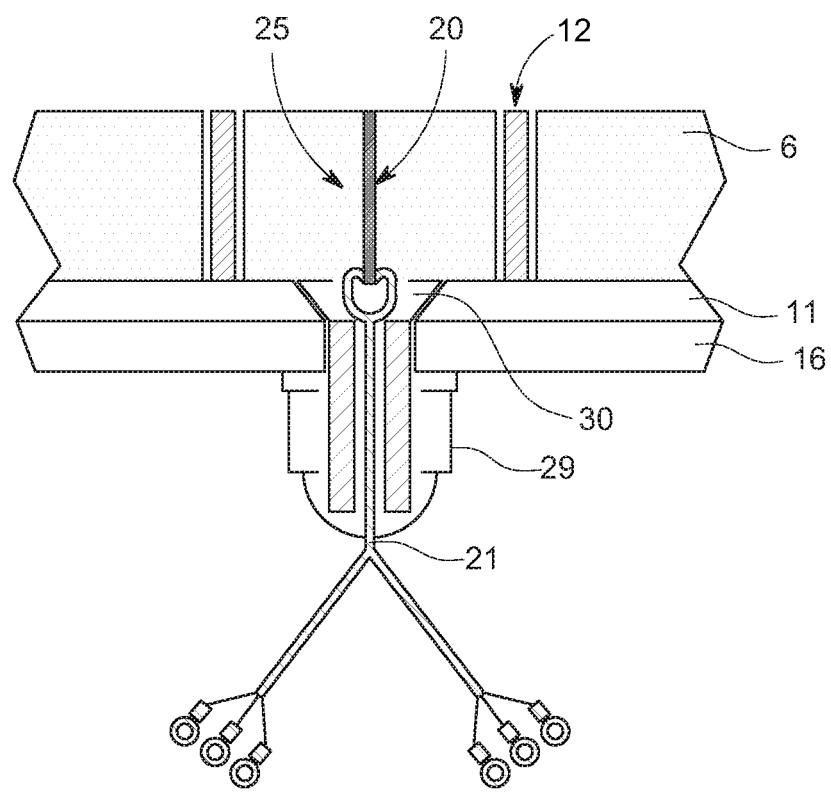
FIG. 12 depicts a second embodiment of a cross-sectional view of the ceramic impact tile mining chute fastening mechanism.

FIG. 12 illustrates a cross sectional view of the fastening mechanism 13 of a ceramic impact panel 8 according to a second embodiment incorporating a sensor 20 configured to alert a user of a wear condition of the impact panel 8. The sensor 20 is disposed inside a plug 25. This plug 25 has a section removed in a radial direction of the plug 25 so that the sensor can be inserted into the plug 25. The sensor 20 is connected to the 3-wire cable 21. The 3-wire cable 21 is connected to the sensor 20 PCB loops 27. The cable 21 extends from the sensor 20 through a fastener 30 and nut 29 to the bottom side of the impact panel 8. The fastener 30 and nut 29 may have a through hole to permit the cable 21 to pass through to the bottom surface of the panel.

Figure 13:
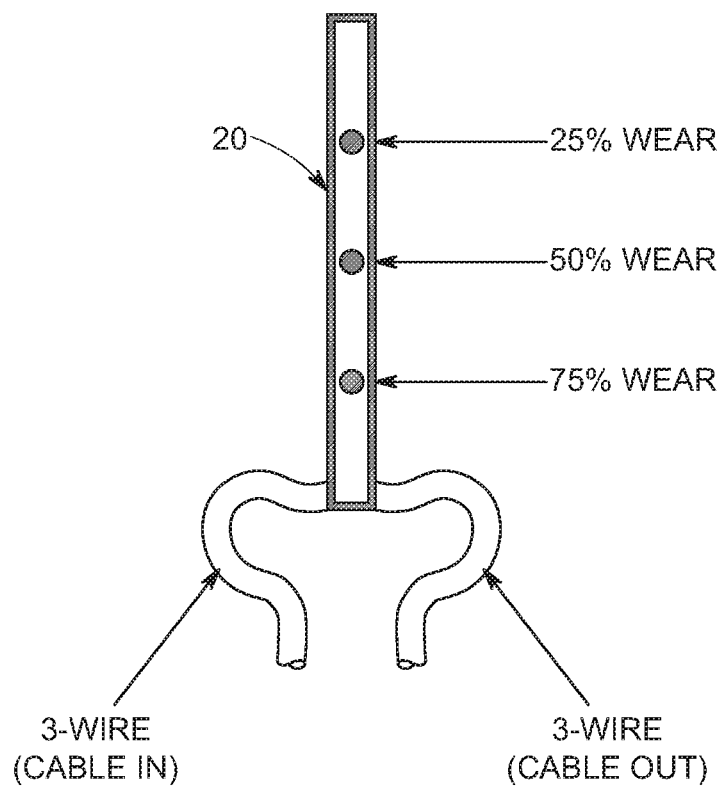
FIG. 13 illustrates wear levels of an impact panel wear sensor according to a second embodiment.
Figure 14:
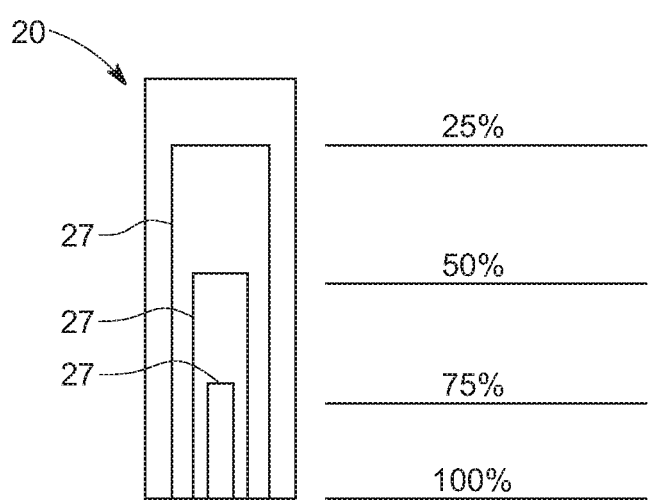
FIG. 14 illustrates conductive loops inside an impact panel wear sensor according to a second embodiment.

FIG. 13 and FIG. 14 depict the sensor 20 and conductive PCB loops 27 used to determine a wear condition of the impact panel 8. The sensor 20 is a thin PCB containing 3 conductive loops 27. Each loop 27 is spaced at threshold levels in the height direction of the PCB. The sensor 20 may for example have threshold levels of 25%, 50%, and 75% wear. When the impact panel 8 is worn so that the thickness of the ceramic tiles 6 has worn by 25% of their original thickness, the PCB conductive loop 27 indicating 25% wear is broken and the user is alerted that the panel is 25% worn. Additionally, once the panel has worn through all of the PCB conductive loops 27, the user may replace the panel since the ceramic tiles 6 are worn indicating that the protective properties of the impact panel 8 are diminished.

This embodiment is not limited to a PCB with 3 conductive loops 27 and a 3-wire cable 21. The sensor 20 and cable 21 may be configured using more or less conductive loops and wires depending on the desired number of alert thresholds.

Figure 15:
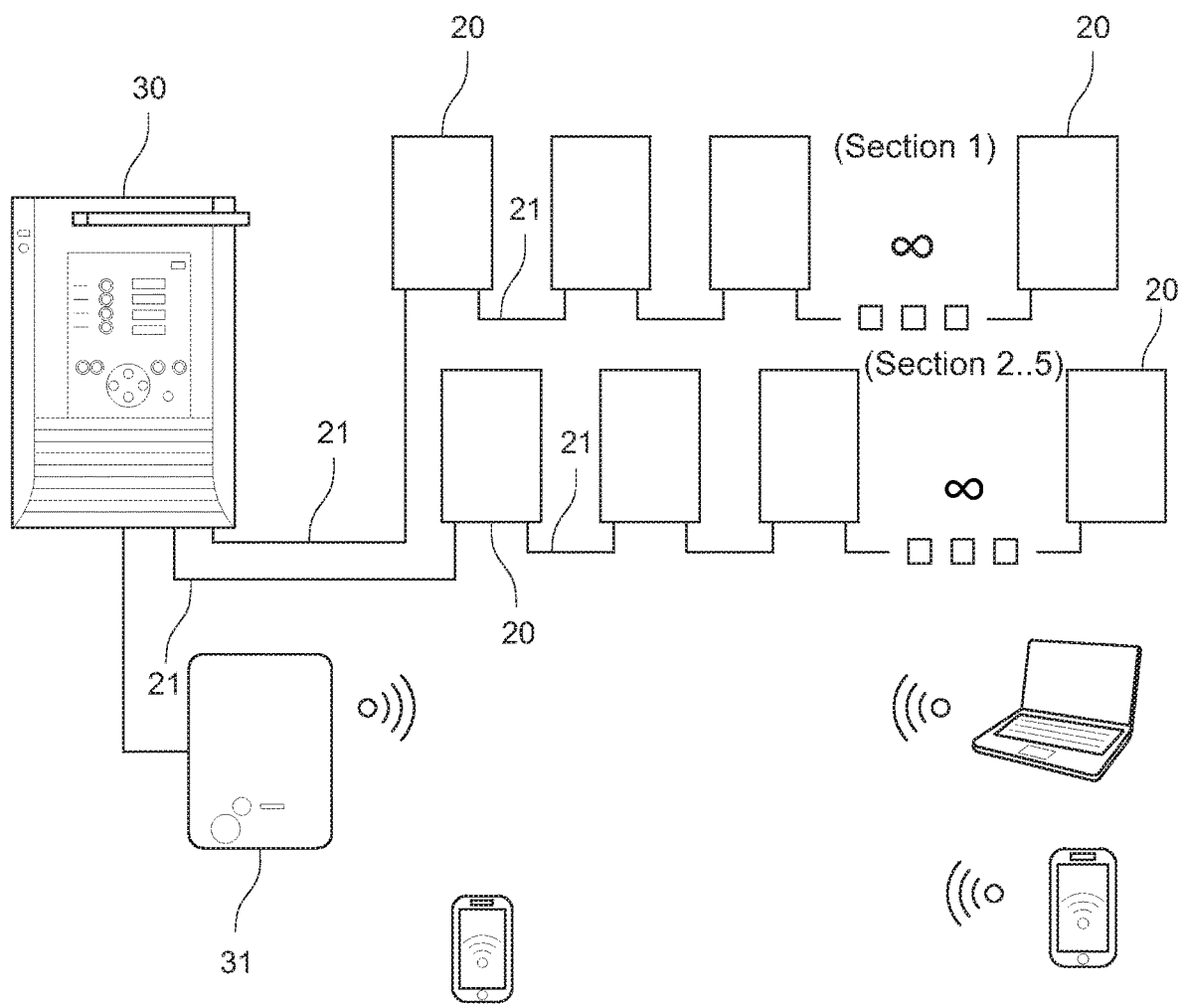
FIG. 15 depicts a system overview of a controller configured to monitor a wear condition of the ceramic impact panel.

FIG. 15 depicts a controller 30 configured to monitor the wear condition of the impact panel 8. The controller 30 may monitor at least one section wherein each section includes at least one sensor 20. However, there is no limit to the number of sensors 20 each section may include. The sensors 20 in each section are connected to the controller 30 in series through the cable 21. That is, the same wire in the 3-wire cable 21 connects to the same loop 27 in each of the sensors 20 contained within each section. When one of the loops 27 inside the sensors 20 is worn, the controller receives a signal that the section has been worn to the corresponding wear threshold. The controller 30 may also include a display that visually indicates a wear level for each of the sections connected to the controller 30. The display may be locally viewed by a user.

The controller 30 may be further configured to be connected to a wireless module 31. The wireless module 31 wirelessly connects the controller 30 via Bluetooth, Global Positioning System (GPS), or Global System for Mobile Communications (GSM) to local and remote monitoring devices. The user may then remotely access the controller through remote monitoring devices including but not limited to cell phones, computers, tablet, internet browsers, etc. Additionally, the controller 30 may be configured to send SMS and email notifications to a user indicating a wear condition of the impact panel 8.

Figure 16:
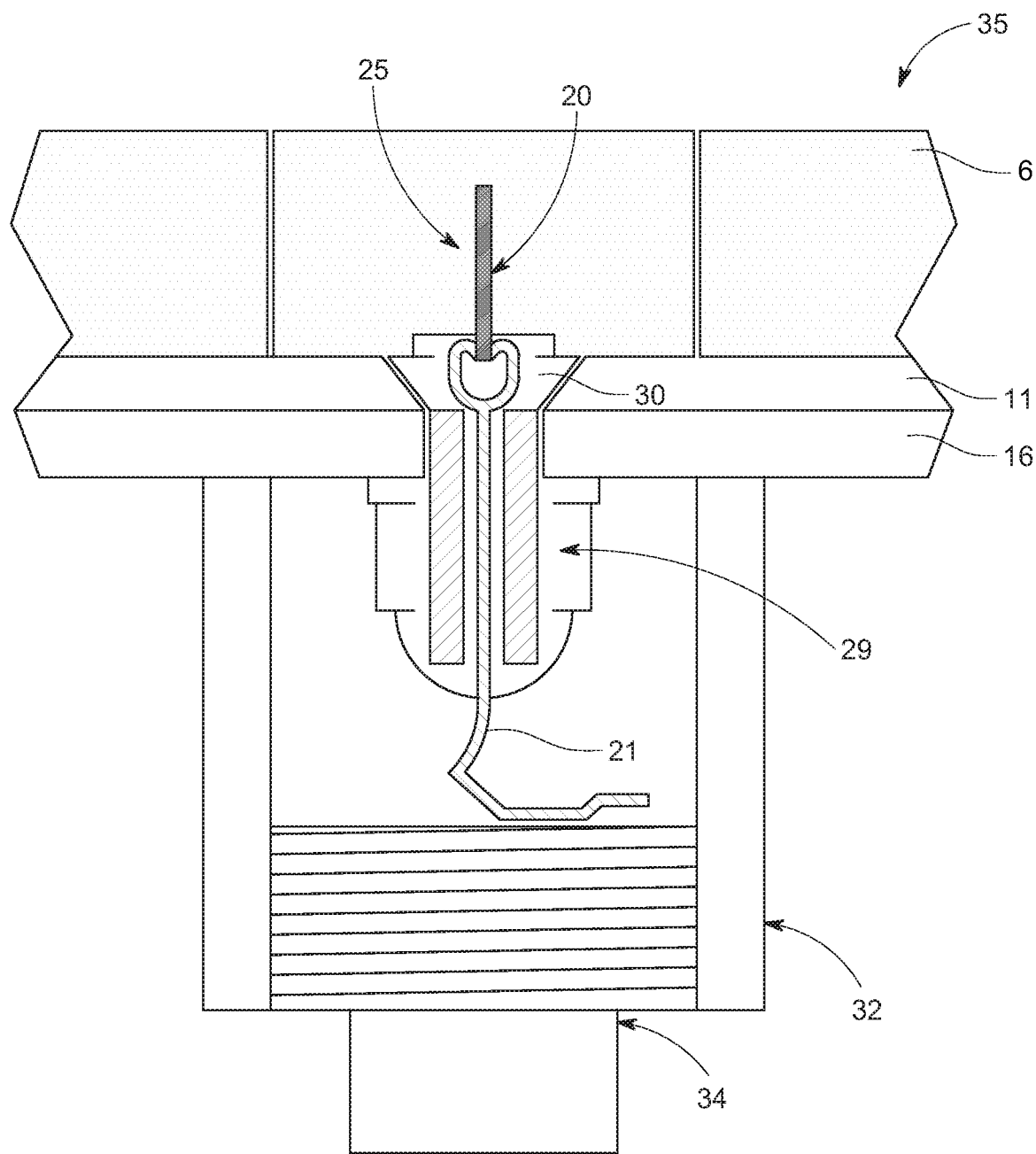
FIG. 16 depicts a cross-sectional view of the ceramic impact tile mining chute fastening mechanism with a pipe plug attached.

FIG. 16 depicts a cross sectional view of the fastening mechanism 35 of a ceramic impact panel 8 according to a third embodiment incorporating a sensor 20 configured to alert a user of a wear condition of the impact panel 8. The fastening mechanism 35 is fitted with a coupling 32 for protecting the cable 21. The coupling 32 is sealed using a pipe plug 34 which prevents the wiring cable 21 from being damaged during transport. The pipe plug 34 may for example be 300 lb and be fully welded to create a water tight compartment on a bottom surface of the impact panel 8 for the sensor cable 21. The sensor 20 is disposed inside a plug 25. This plug 25 has a section removed in a radial direction of the plug 25 so that the sensor can be inserted into the plug 25. The sensor 20 may or may not extend the entire height of the plug 25. The sensor 20 is connected to the 3-wire cable. The 3-wire cable 21 is connected to the sensor 20 PCB loops 27. The cable 21 extends from the sensor 20 through a fastener 30 and nut 29 to the bottom side of the impact panel 8. The fastener 30 and nut 29 may have a through hole to permit the cable 21 to pass through to the bottom surface of the panel.

Figure 17:
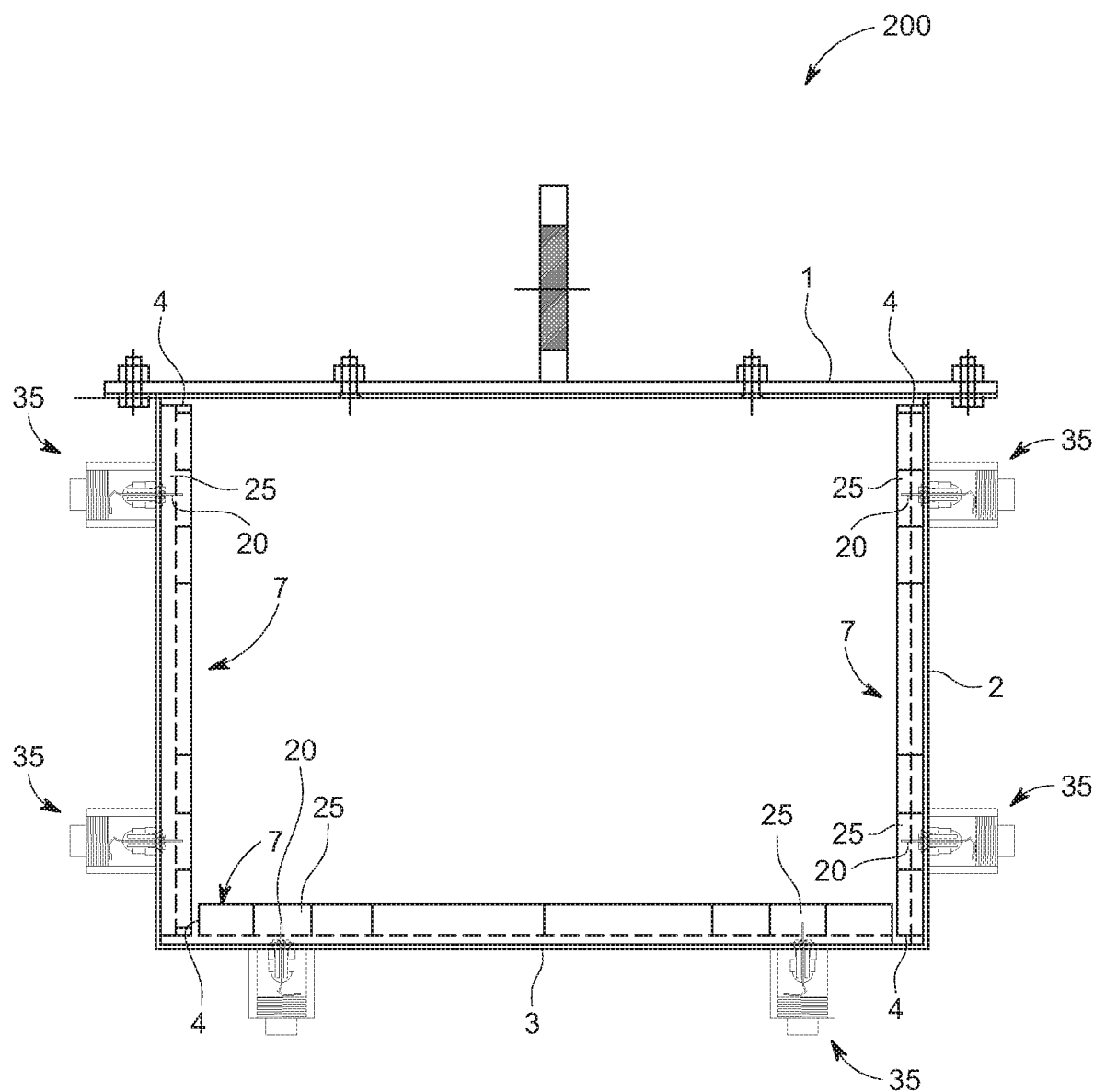
FIG. 17 depicts a cross-sectional view of a mining chute configured for transport with pipe plugs attached to the fastening mechanisms.

FIG. 17 depicts a cross section of a mining chute 200. The fastening mechanisms 35 depicted in FIG. 16 are used to secure the impact panel 8 to the bottom panel 3 and side panels 2. Once the mining chute 200 is transported to the target destination, the pipe plugs 34 may be removed and replaced with wireless transmitters 33 or the cable 21 may be wired to the controller 33 so that a user can remotely monitor a wear condition of the impact panel 8.

Figure 18:
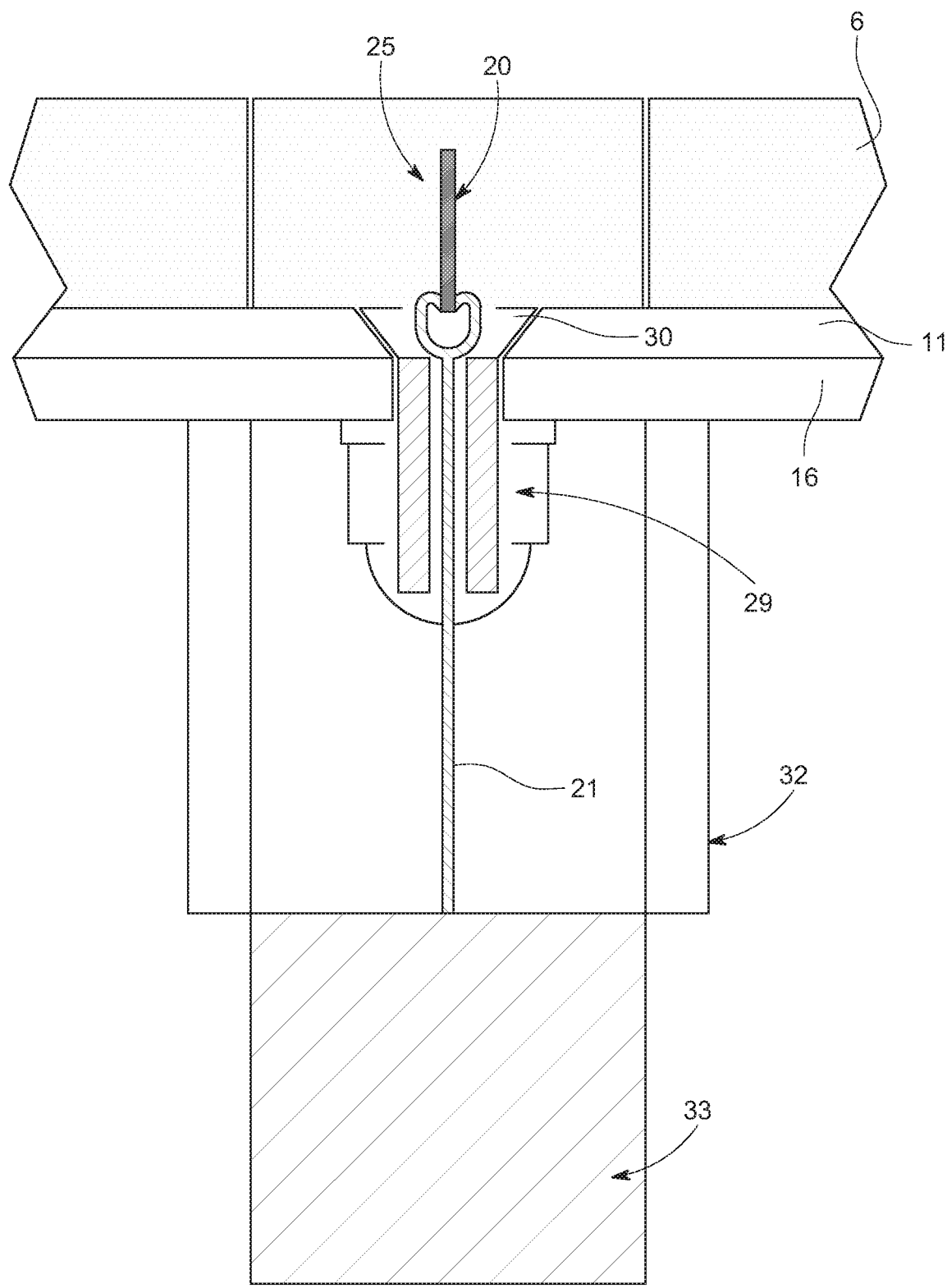
FIG. 18 depicts a cross-sectional view of the ceramic impact tile mining chute fastening mechanism with a wireless transmitter attached.

FIG. 18 depicts the fastening mechanism 35 with a wireless transmitter 33 attached to the coupling 32. The wireless transmitter 33 is connected to the 3-wire cable 21 enabling the user to monitor the wear of the impact panel 8 once the pipe plug 34 is removed. This enables quick installation of the mining chute 200 once the chute 200 reaches the installation location. This setup is not limited to the mining chute 200 and may be implemented on any apparatus that is fitted with ceramic impact panels 8. The wireless transmitter 33 sends the wear condition measured by the sensor 20 to the controller 30. The user then may remotely monitor the wear condition of each impact panel using remote monitoring device, such as a computer, laptop, cell phone, tablet, or internet browser.

Figure 19:
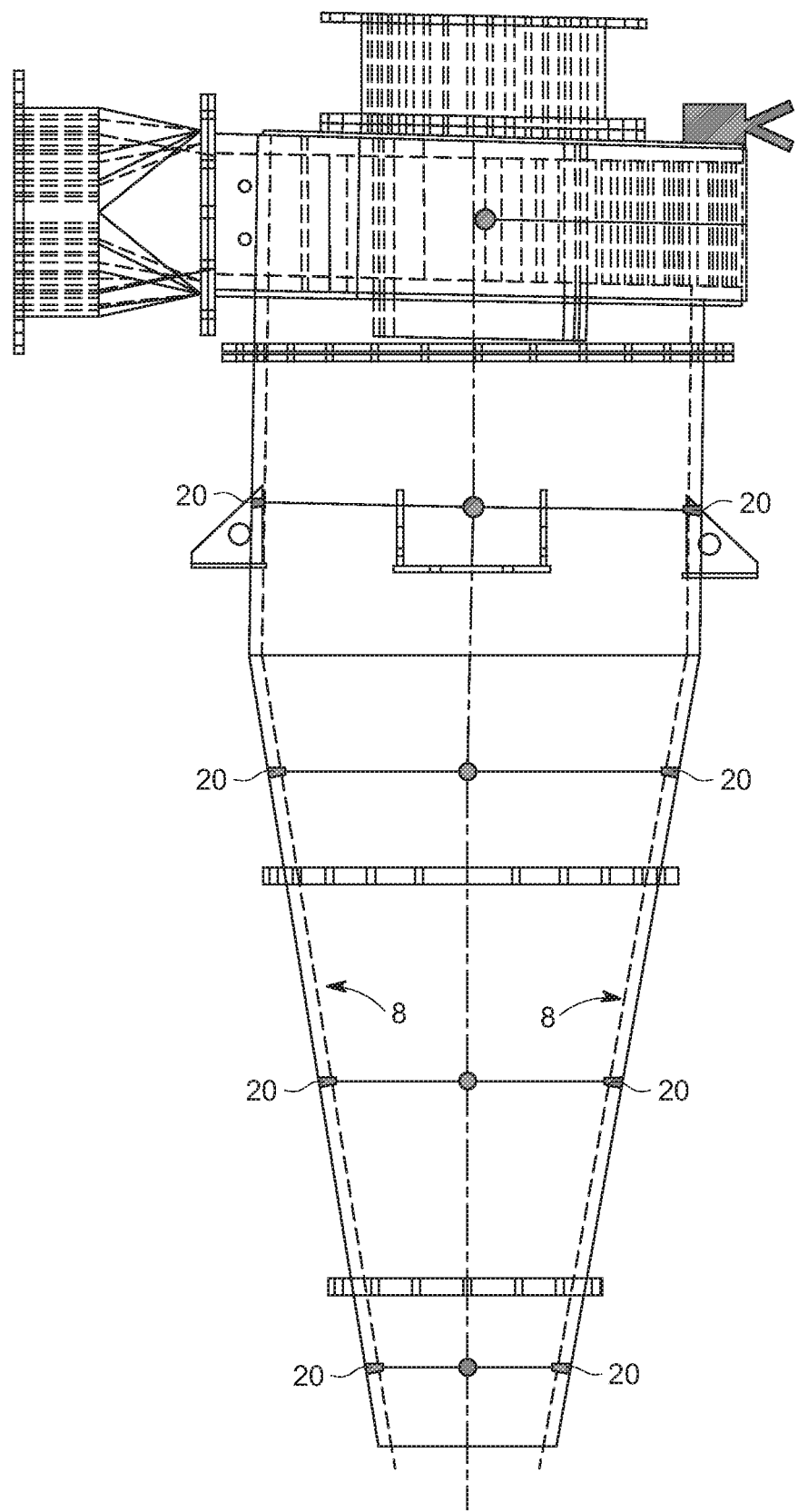
FIG. 19 depicts a top view of an impact cyclone fitted with impact panels and sensors.
Figure 20:
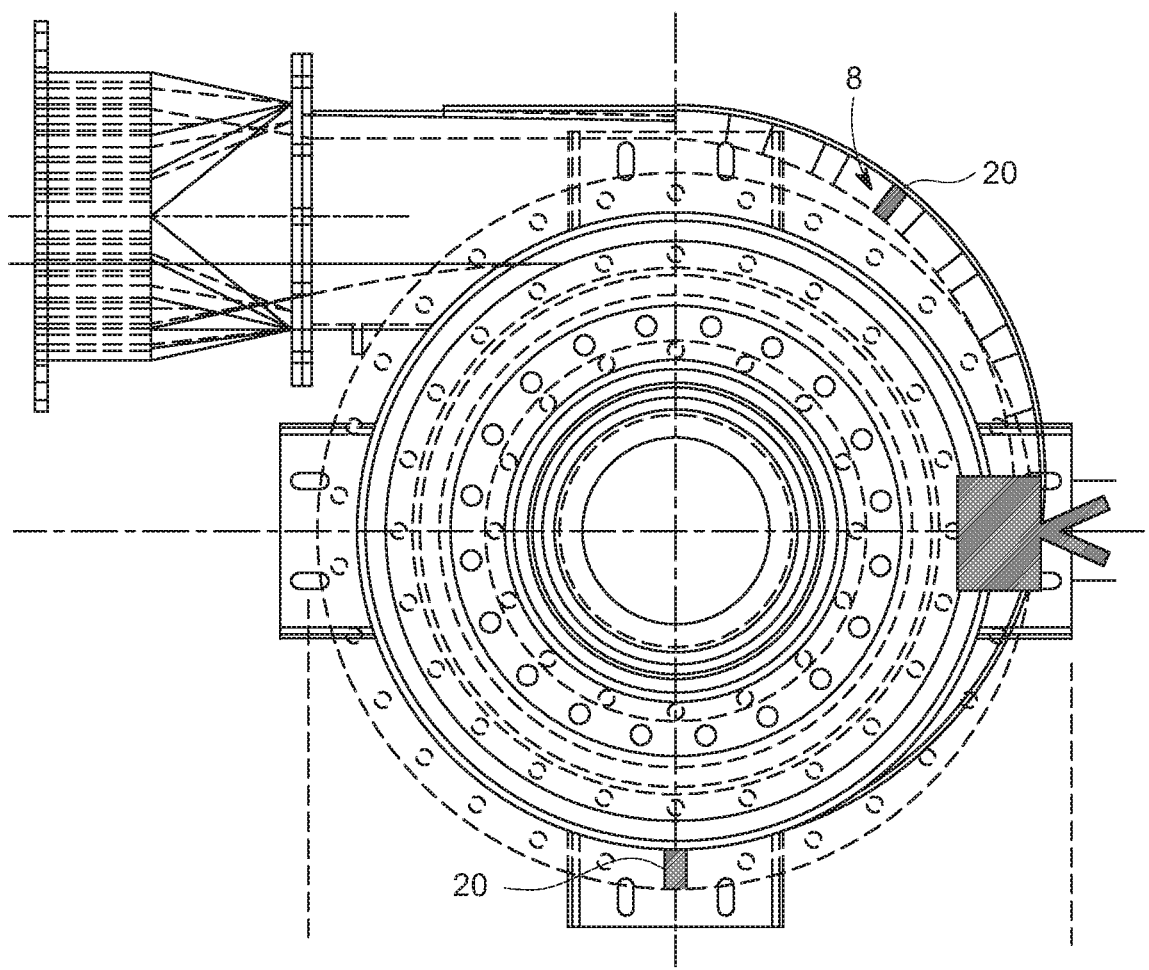
FIG. 20 depicts a cross sectional view of an impact cyclone fitted with impact panels and sensors.

FIGS. 19 and 20 depict an impact cyclone fitted with sensors 20 and impact panels 8. The interior surfaces are lined with a plurality of impact panels 8 to protect the cyclone body. The sensor's 20 are fitted within the cyclone impact panels 8 in the same manner described above.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Note that all the exemplary embodiments described herein are mere examples of embodiments that implement the disclosed features, and the technical scope of the disclosure should not be construed in a limiting sense by these exemplary embodiments. That is, the disclosure can be implemented in various forms without departing from the technical concept thereof or the primary features thereof.

What is claimed is:

1. An impact panel comprising:
   a plurality of ceramic tiles affixed to a base plate, the base plate including at least one base plate through hole;
   a sensor configured to measure a wear condition of the impact panel;
   at least one fixing hole disposed within a tile of the plurality of ceramic tiles;
   at least one ceramic plug configured to be inserted into the at least one fixing hole; and
   a fastener with a fastener through hole that extends therethrough; wherein
   the fastener fastens the impact panel to an attachment surface;
   the fastener is disposed inside the at least one base plate through hole such that a top of the fastener is not higher than a top of the base plate; and
   at least one cable connects the sensor to a controller through the fastener through hole;
   the at least one ceramic plug is disposed over the fastener member in the at least one fixing hole to seamlessly cover the at least one fixing hole;
   a diameter of the fixing hole is greater than a diameter of a head of the fastener member so that the fastener member can be inserted into the fixing hole; and
   the sensor is disposed in the at least one ceramic plug.

2. The impact panel of claim 1, further comprising a frame disposed around an outer peripheral edge of the plurality of ceramic tiles and affixed to the base plate.

3. The impact panel of claim 2, wherein the frame is metal.

4. The impact panel of claim 2, wherein
   the frame has a rectangular shape;
   four ceramic tiles of the plurality of ceramic tiles are provided respectively at corners of the frame;
   the at least one fixing hole is provided in one of the four ceramic tiles provided at corners of the frame; and
   the plug is provided within the one of the four ceramic tiles provided at corners of the frame.

5. The impact panel of claim 2, wherein
   the frame has a rectangular shape;
   four ceramic tiles of the plurality of ceramic tiles are provided respectively at corners of the frame;
   the at least one plug comprises four plugs;
   the at least one fixing hole comprises four fixing holes provided in the four ceramic tiles; and the four plugs are respectively provided within the four ceramic tiles.

6. The impact panel of claim 1, further comprising the controller configured to monitor the wear condition of the impact panel measured by the sensor.

7. The impact panel of claim 6, wherein the wear condition monitored by the controller is remotely accessible from a remote monitoring device.

8. The impact panel of claim 6, wherein the wear condition monitored by the controller is accessible from a monitoring device.

9. The impact panel of claim 6,
wherein
the sensor includes at least one conductive loop used to measure the wear condition of the impact panel;
the cable contains a number of wires equal to a number of conductive loops in the sensor; and
the wires connect the at least one conductive loop and the controller to form a circuit.

10. The impact of claim 9, wherein the controller visually indicates the wear condition of the impact panel when the circuit is broken due to impact panel wear.

11. The impact panel of claim 1, wherein
the sensor is a printed circuit board having a plurality of conductive loops, and
the plurality of conductive loops, when broken, indicate the wear condition of the impact panel.

12. A method for installing a ceramic impact panel sensor and monitoring a wear condition of the ceramic impact panel, the method comprising:
sealing a sensor and wiring inside a coupling using a pipe plug to protect the sensor and the wiring during transport;
removing the pipe plug;
attaching the wiring to a wireless transmitter;
attaching the wireless transmitter to the coupling; and
remotely monitoring a wear condition of the impact panel by a remote monitoring device.

* * * * *